(12) United States Patent
Lieser et al.

(10) Patent No.: US 6,749,790 B1
(45) Date of Patent: Jun. 15, 2004

(54) HANDLE FOR A HAND TOOL AND METHOD FOR THE MANUFACTURE THEREOF

(75) Inventors: Karl Lieser, Wuppertal (DE); Andreas Dierolf, Untermuenkheim (DE)

(73) Assignee: Adolf Wurth GmbH & Co. KG, Kuenzelsav (DE)

( * ) Notice: Subject to any disclaimer, the term of this patent is extended or adjusted under 35 U.S.C. 154(b) by 0 days.

(21) Appl. No.: 09/713,855

(22) Filed: Nov. 16, 2000

(30) Foreign Application Priority Data

Nov. 19, 1999 (DE) .......................... 299 20 323
Mar. 4, 2000 (DE) .......................... 100 10 675
Mar. 4, 2000 (DE) .......................... 200 04 135

(51) Int. Cl.[7] .............................................. H05B 6/02
(52) U.S. Cl. .................... 264/279; 264/254; 16/436; 16/DIG. 19; 81/177.1
(58) Field of Search .................. 16/436, 430, 902, 16/DIG. 12, DIG. 19; 81/177.1, 489; D8/82, 83; 15/143.1; 264/245, 243, 254, 255, 279

(56) References Cited

U.S. PATENT DOCUMENTS

| | | | | |
|---|---|---|---|---|
| 2,202,253 A | * | 5/1940 | Hiatt ........................ 40/629 |
| 5,168,600 A | * | 12/1992 | Huang ........................ 16/422 |
| 5,290,063 A | * | 3/1994 | Lenhart ................. 16/DIG. 12 |
| 5,421,224 A | * | 6/1995 | Bond ........................... 81/436 |
| 5,601,003 A | * | 2/1997 | Amtenbrink et al. ....... 81/177.1 |
| 5,740,586 A | * | 4/1998 | Gomas ........................ 16/436 |
| 5,956,799 A | * | 9/1999 | Panaccione et al. .......... 16/430 |
| 5,964,009 A | * | 10/1999 | Hoepfl et al. ................. 16/430 |
| 6,094,781 A | * | 8/2000 | Jansson et al. ............... 16/436 |
| 6,195,830 B1 | * | 3/2001 | Bruschi ....................... 16/430 |
| 6,199,460 B1 | * | 3/2001 | Lo ............................ 81/177.1 |

FOREIGN PATENT DOCUMENTS

EP  0 330 870 A2  2/1989

* cited by examiner

Primary Examiner—Anthony Knight
Assistant Examiner—Doug Hutton
(74) Attorney, Agent, or Firm—Quarles & Brady

(57) ABSTRACT

The invention relates to a handle for a hand tool and a method for the manufacture of the handle.

Figure 1:
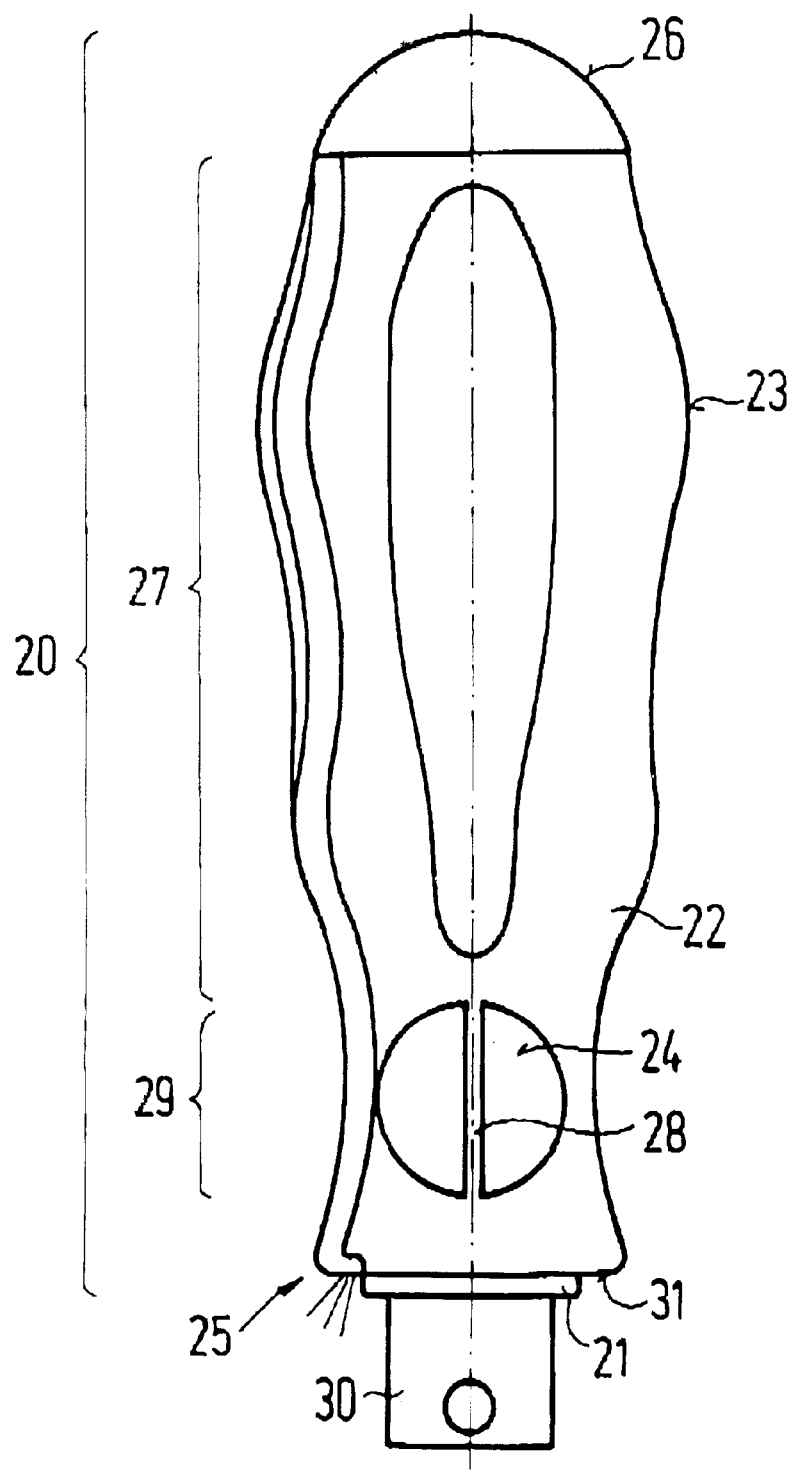

The problem of the invention is to provide a handle for a hand tool, whose surface is formed from areas of distinguishable materials and which simultaneously has a good and pleasant grippability.

A handle according to the invention for a hand tool, particularly a turning tool, is made from plastic. It has a surface from flush-connected areas of distinguishable materials. The two materials can be distinguished from one another.

19 Claims, 5 Drawing Sheets

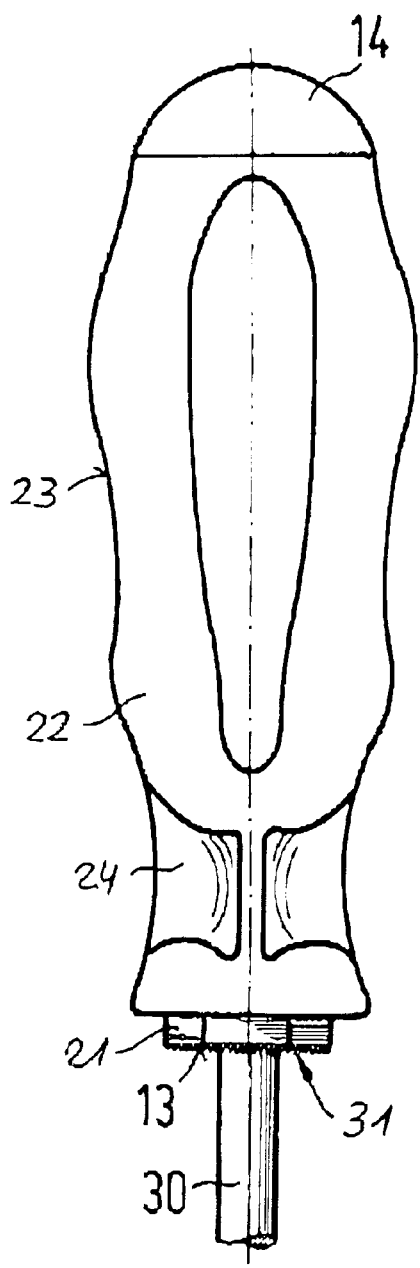
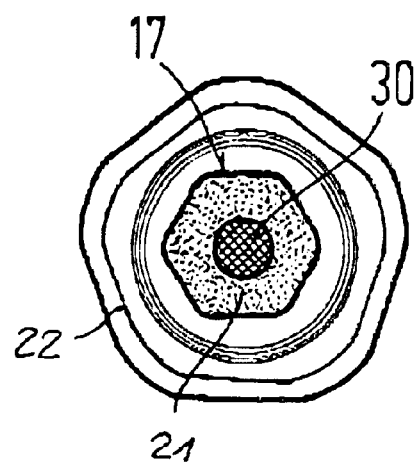
FIG. 5
FIG. 6

HANDLE FOR A HAND TOOL AND METHOD FOR THE MANUFACTURE THEREOF

The invention relates to a handle for a hand tool and a method for he manufacture of the handle.

Hand tools are known which have a handle having a two-colour structure. During the injection moulding of the handle, plastics of different colour are injection moulded in successive moulding processes. This leads to a two-coloured gripping area of the handle. The multicolour design of the handle in the gripping area makes it possible to render the handle conspicuous and therefore make it easier to find the tool.

It is also known to manufacture handles for hand tools from at least haptically distinguishable areas, a front area being made from a stiffer material and serves as the rapid turning or support zone and a rear area is used for good, more pleasant gripping. The rear area is usually cross-sectionally polygonal and is convex in longitudinal section. The preferred material is a soft, warm, usually rubber-like material with a good gripping feel.

It is disadvantageous in connection with such handles that the injection moulding point for the plastic, particularly of the rear area, is in the user gripping area. The injection moulding point is a location where the surface has an obstruction, usually in the form of a protuberance, and which also normally has a surface hardening at this point. This is prejudicial to the use of the tool, because particularly in the case of turning tools the injection moulding point is constantly and repeatedly in the high sensitivity area of the skin surface. An unpleasant gripping feeling results from this.

The problem of the invention is to provide a handle for a hand tool, whose surface is formed from areas of distinguishable materials and which simultaneously has a good, pleasant grippability.

This problem is solved by the characterizing features of the independent claims.

A handle according to the invention for a hand tool, particularly a turning tool is made from plastic. It has a surface of flush-connecting areas of distinguishable materials. The handle is made from a first material forming a core and which as raised portions forming the surface areas. At least in the vicinity of the tool-side end of the handle, the handle surface is formed from the first material. In said surface areas of the first material is formed at least one flow channel extending up to the handle surface. Onto the core is injection moulded a second material forming the handle surface in other areas. The two materials can be distinguished from one another. The injection moulding point for the second material is positioned in such a way that it is located outside the handle gripping area.

According to an advantageous development the second material forms a one-part moulding.

The areas of the handle surface made from the first material, when viewed from the outside, are embedded in the manner of a mosaic in areas of the second material.

According to an advantageous development of the embodiments the injection moulding point for the second material is located at the tool-side end, particularly at the tool-side face of the handle.

According to a preferred embodiment of the invention the materials are chosen in such a way that they are haptically and/or optically mutually distinguishable. Preferably the second material has a higher static friction coefficient than the first material. Preference is also given to embodiments in which the second material forms most of the handle surface. In particular, the second material completely forms the surface part where the torque is manually applied during a turning process.

It is also advantageous if the surface areas of the first material are at the tool-side end completely surrounded by preferably continuous surface areas of the second material.

According to another, advantageous development of the invention at the handle end remote from the tool, the surface has a cap-like surface of the first material.

According to another preferred development of the invention the handle surface is constructed as an information carrier. Preference is given to a design in which the information is contained in the structure of the area boundaries between the surfaces of the first and second materials. The information can also relate to the quality, the intended use, the manufacturer (name and logo) and place of manufacture. Such information must be applied in non-removable, readily visible form on the handle surface. It is also advantageous if the area boundaries between the first and second materials are constructed in such a way that the shape of the areas of the first material represents the intended use of the tool.

Thus, e.g. the cap-like surface of the first material can have the contour of a cross in order to symbolize that the tool is a screwdriver for Phillip's screws. A hexagonal outline of the outer contour of the cap-like surface of the first material can symbolize an outer polyhedral screwdriver. The information carrier is designed in such a way that the information is applied in non-erasable manner, but a smooth surface contour still exists.

It is also possible in the outwardly closed areas of the first material to introduce areas of the second material in the manner of a mosaic. This can e.g. take place in that in the first material areas closing said area to the outside flow channels are formed below the surface through which material flows during the injection moulding of the second material and can consequently flow into the otherwise outwardly closed area of the first material.

In the case of a handle for a hand tool advantageously alternatively or additionally the substantially radially oriented face constructed at its tool-side end can be constructed as an information carrier. According to a preferred development the information is formed by optically detectable contour lines on the end face. Preferably the contour lines are formed by a relief on said face. Alternatively, according to a preferred development of the invention, it is possible to form the contour lines as a boundary between at least optically distinguishable materials.

Alternatively and additionally it is also possible to have in the area of the area boundaries between the first and second materials undercuts of the materials located below the surface in order to bring about a better hold of the materials on one another. It can also be generally advantageous if the core made from the first material is provided with axially directed ribbings, which are filled with the second material and consequently bring about a mutually twist-prevented retaining of the second material on the first material. It is advantageous to provide undercuts at boundary locations between areas of the first material and areas of the second material, in order to bring about a more stably positioned retention, particularly of the areas of the second material.

According to another development of the invention the handle is undetachably shaped onto a tool, which is preferably a screwdriver.

Preference is also given to developments in which the handle has a ribbed gripping portion. The ribbing of the gripping portion advantageously serves to bring about an improved force transfer between hand and handle. It is advantageous to have between the ribbed gripping portion and the tool-side end of the handle, a portion having a circular cross-section, which has a diameter reduction, which is concavely extended towards the gripping section and towards the tool-side end and is consequently constructed as a supporting or rapid turning zone. Preferably the surface of the handle in the rapid turning zone is at least partly and preferably preponderantly formed from the first material. These are in particular developments in which two or more areas of the first material are present, which are separated from one another by flow channels of the second material. Preference is also given to developments in which the cap-like end of the first material is shaped like a spherical segment. It is also advantageous if the face of the handle is at least preponderantly made from the first material. It is also preferable to construct towards the outside on the handle face a ring of the second material, which frames the front area of the first material, the front area of the first material remaining visible.

A method according to the invention for the manufacture of a handle according to the invention incorporates the steps of inserting the injection moulding core in a first mould serving as the female mould for the injection moulding of the first material and the injecting of a first material round the injection moulding core. Subsequently said core is placed in a second injection mould, which is constructed as a female mould for the complete handle surface. Then, from an injection moulding point located outside the gripping area of the handle, the second material, which is distinguishable from the first material, is injection moulded on and the injection moulding of the first material takes place in such a way that in the first material is formed at least one flow channel, so that the second material gives a one-piece, continuous moulded part.

The first material is preferably polypropylene. The second material is preferably an elastomer, particularly a thermoplastic elastomer. The injection moulding core is preferably constituted by the actual tool, e.g. the blade of a screwdriver.

The invention is described hereinafter relative to preferred embodiments and the attached drawings, wherein show:

FIG. 1 A handle injection moulded onto an injection moulding core.

Figures 2A, 2B:
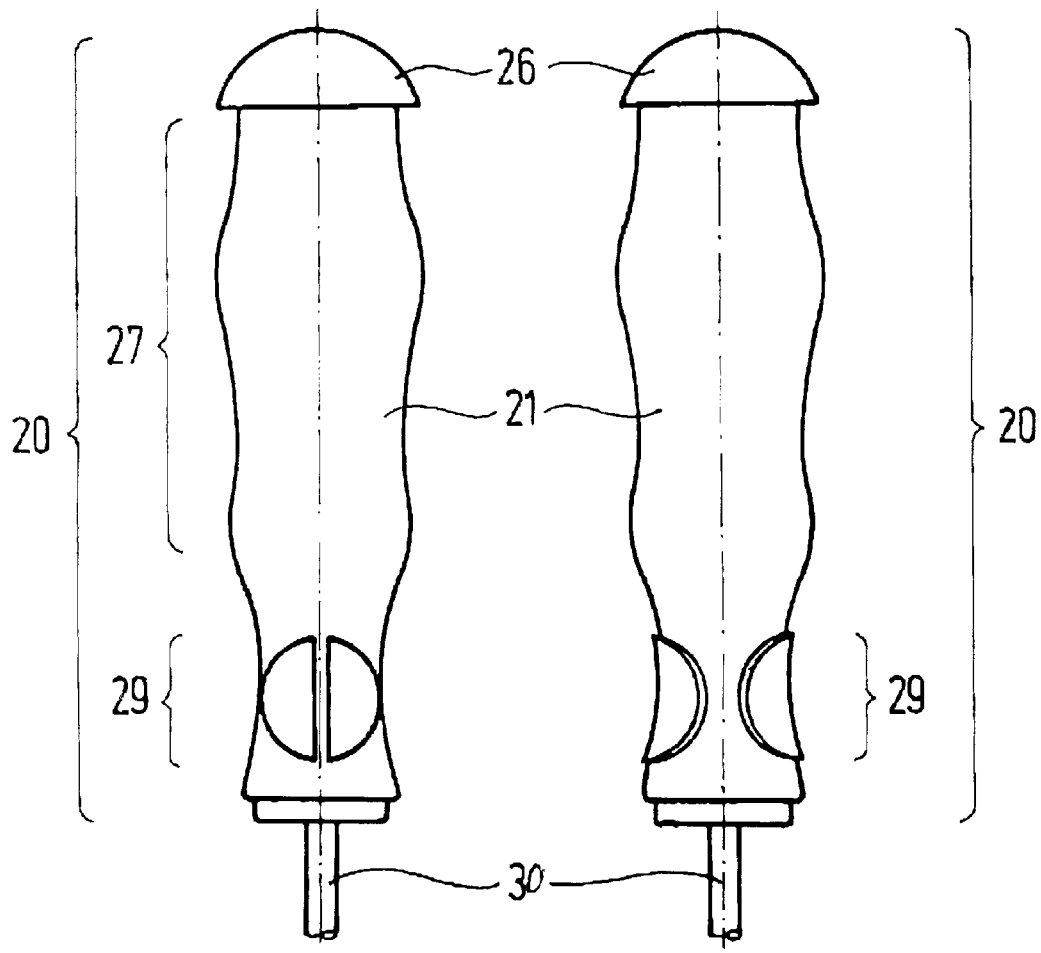

FIG. 2 A partly finished handle following the injection moulding of the first material.

Figure 4:
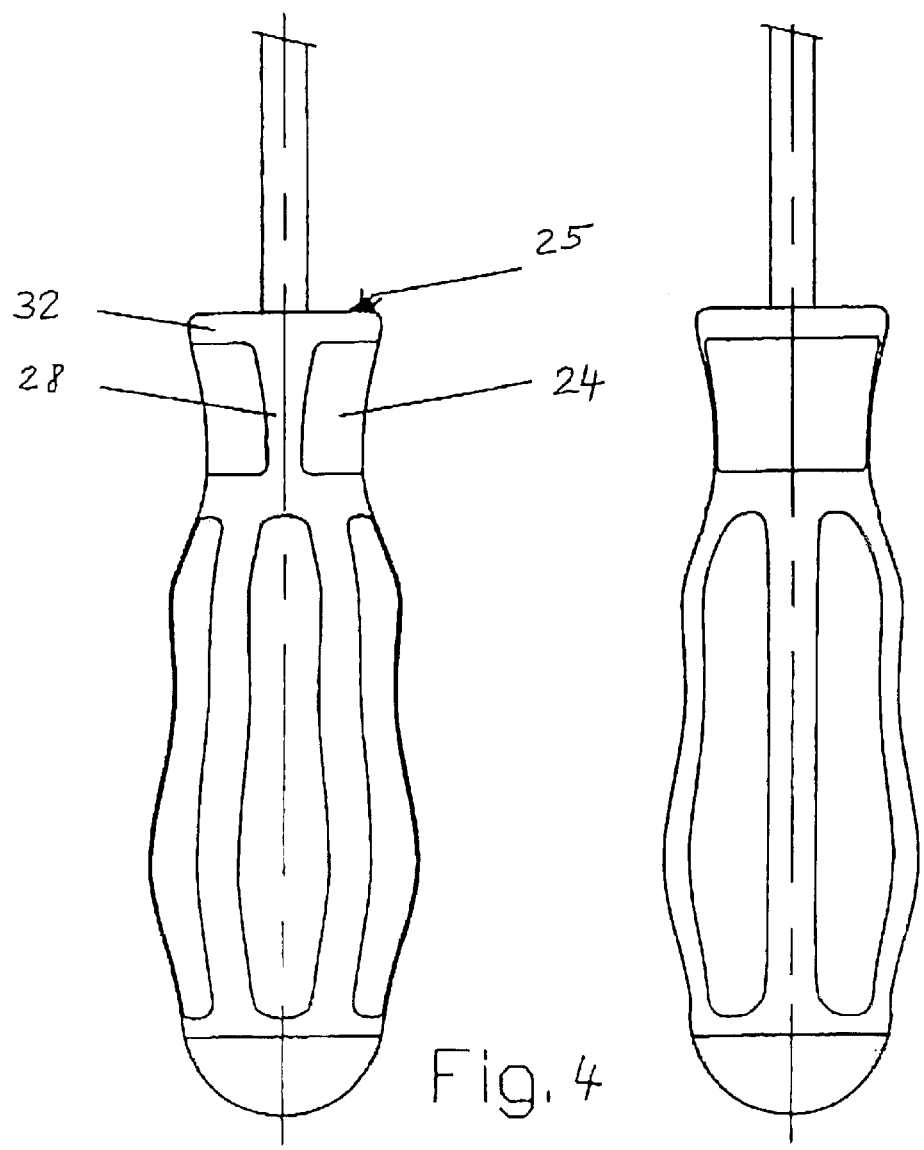
Figure 3:
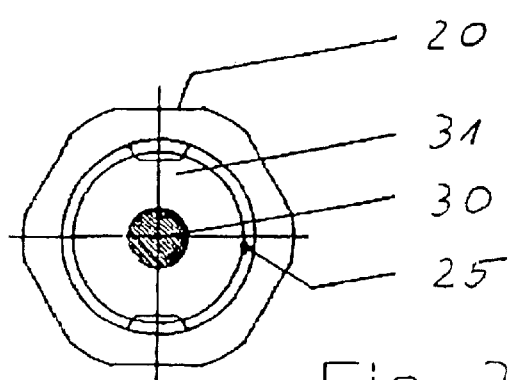

FIGS. 3 & 4 Another embodiment of a handle according to the invention.

FIG. 5 A side view of a handle with a front information carrier.

FIG. 6 The plan view of the face of another handle with a front information carrier.

Figure 7:
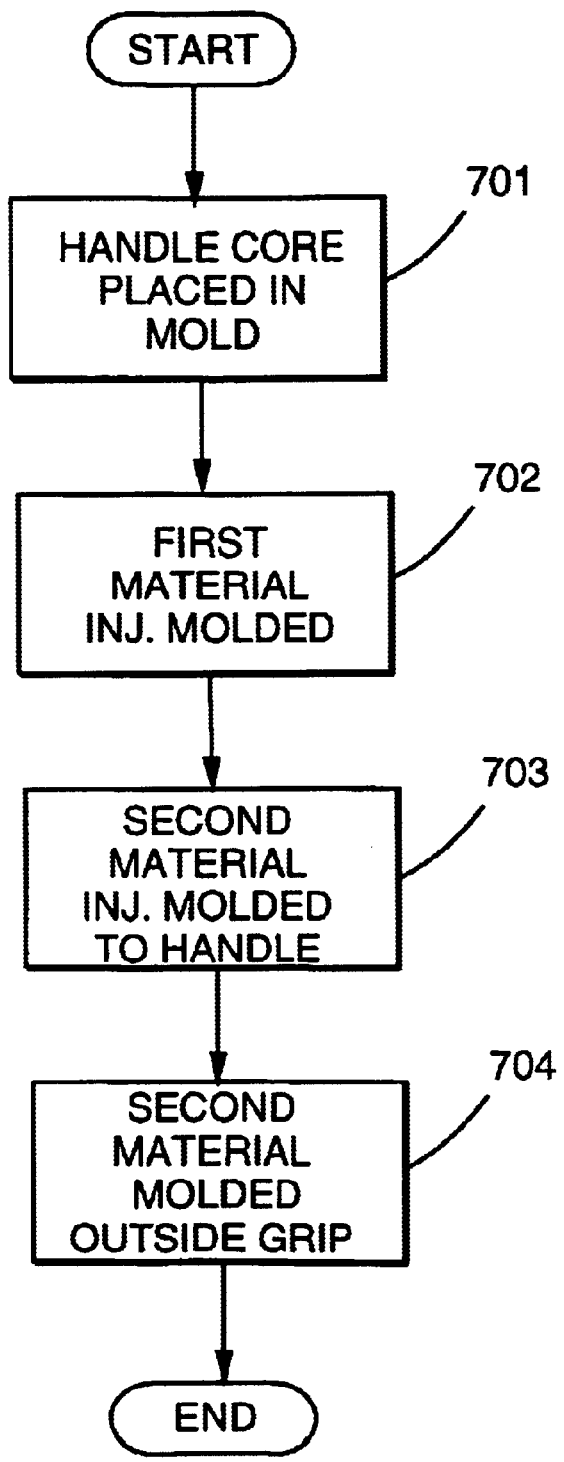

FIG. 7 The flow chart of a method according to the invention.

FIG. 1 is a view of a handle of a rotary tool, e.g. a (slotted) screwdriver. The handle is injection moulded round an injection moulding core, whereby the latter can be both the tool, i.e. the blade of the screwdriver, and a core which subsequently forms either a holder for a replacement tool or a filler for the injection moulding process and which is subsequently removed. If the injection moulding core 30 constitutes the tool blade or shank, it does not have a smooth surface in the gripping area, so as to permit a good, loss-secured injection moulding round of the injection moulding core.

At its end remote from the tool, the handle 20 has a solid, spherical segmental surface part 26 made from the first material. The first material also forms the core 21, which surrounds the injection moulding core 30 in the vicinity of the handle 20. To the area of the spherical segmental surface part 26 is connected the gripping area 27 of the handle, which has a ribbed structure, so that there is a better force transfer from the hand to the tool. Preferably the gripping area 27 essentially has the outer contour of a pentahedron. The surface 23 of the gripping area is part of the area 22, whose surface is formed from the second material. The second material is preferably an elastomer, particularly a thermoplastic elastomer. The second material preferably has a higher static friction coefficient than the first material. Relative to the entire handle surface, the surface formed from the second material preponderates, the gripping area 27 according to the represented construction being almost exclusively formed from the second material. The second material also forms a one-piece, continuous moulding. The areas of the surface of distinguishable materials are connected in flush manner, so that at best a transition line can be seen or felt, as is also the case with tarsias. In the transition area there should be a very continuous outer contour, so that no edge is formed. The tangibility of the transition between the areas of different materials should solely result from the haptically detectable distinguishability of the materials. In order to obtain a good binding between the areas of the first and second materials, undercuts can be provided below the surface.

To the gripping area 27 is connected a rapid turning zone 29. The rapid turning zone 29 is an unribbed area of the handle having the narrowest point of the handle and being concavely, bilaterally widened from the narrowest point. It is connected by one concavely widened side in seamless manner to the gripping area 27. The other concavely widened side of the rapid turning zone 29 issues into the tool-side end of the handle, terminated from the face 31 towards the tool. The rapid turning zone 29 has surface areas 24 formed from the first material and which are constructed as raised projections with respect to the remaining core 21. The surface area 24 is flush with the remaining handle surface in this area. The boundary line between the surface area 24 from the first material and the surface area 23 from the second material can be constructed as an information carrier. In order to provide this information, the two materials can have distinguishable colours and can as a result be optically distinguished from one another. The information is provided by the contour of the boundary line between the two materials.

In the represented case it is a circle with a slot. This symbol can e.g. represent a slotted screw and therefore indicate that the tool is a slotted screwdriver. Between the information elements there are flow channels (material bridges) for the second material. Alternatively to such a design it is also possible for the surface of the first material 24 to preponderate in the area of the rapid turning zone and only narrow flow channels 28 of the second material are formed. Then between the area of the first material and the face 31 there is a preferably narrow ring of the second material, so that from the second material is formed a continuous, one-piece moulding. The position of the injection moulding point 25 for the second material is chosen in such a way that it is either located in the vicinity of the ring or in the vicinity of the face 31. It is always outside the gripping area 27 and outside the rapid turning zone 29 at the tool-side end of the handle.

For further designs it is e.g. possible to provide contours and boundary lines suitable for providing information between the first and second materials for forming areas of the second material, which are completely surrounded at the surface by the first material. For this purpose in the area of the first material channels are preferably provided, which are formed below the surface in portions of the raised part of the first material, which forms the surface parts of the first material and through which the inner area can be filled with the second material. The channels can also perform the function of keeping securely on the handle the enclosed second material. This can also be assisted or substituted in that in the vicinity of the boundary lines undercuts are formed between the first and second materials. Thus, on the tool-side end of the handle are preferably formed discontinuous areas of the surface of the first material.

FIG. 2 shows the partly finished handle following the injection moulding of the injection moulding core 21 and the raised areas, which form the areas 26, 24 of the surface of the first material, preferably PPN. FIG. b) shows a view turned by 90° compared with FIG. a).

FIG. 2 shows the injection moulding core 30 with the first material core 21 injection moulded thereon. The handle 20 is raised in the same way in the vicinity of the cap-like upper part 26 as the contour of the core 21 as in the first material surface area 24. In the gripping area 27 and in all other areas, whose surface is to be subsequently formed from the second material, there is a recess for the second material, which corresponds to the subsequent layer thickness of preferably several millimetres of the second material. The raised areas forming the surface areas of the first material are raised by the same dimensional quantity compared with the remaining core 21.

FIG. 2 shows with its two partial views a) and b) the product following the first method step. It is also possible to see a female mould for the injection mould, which is required for injection moulding the injection moulding core 30 with the first material. The injection mould is preferably formed from two half-shells, which are closed and in which can be placed the injection moulding core 31 and which is simultaneously oriented in the injection mould. Following the closure of the injection mould, injection moulding takes place of the first material. Subsequently the partly finished "semifinished product" is removed from the injection mould and optionally, following a short cooling and/or curing time, is placed in a second injection mould. The contour of the second injection mould is the sought surface contour of the handle 20. A corresponding female mould of this injection mould is shown in FIG. 1. This is followed by the injection moulding of the second material into the injection mould, which takes place by means of an injection moulding point, which is located in the vicinity of the tool-side end of the handle, but which is positioned outside the gripping area. It is preferably in the vicinity of the face of the handle.

In the raised areas of the first material is injection moulded at least one flow channel for the second material.

FIGS. 3 and 4 also show a handle made from two plastics. A core handle 21 is injection moulded from a rigid plastic and on the core handle 21 in a second injection moulding layer is injection moulded a jacket 22 or regions of flexible plastic (elastomer) with a different colour compared with the core handle 21.

As in the case of elastomers 22 the adhesion of printing inks is very poor, in a zone 24 of the handle surface the core handle is not enveloped with an elastomer jacket 23. In order to obtain good haptics of the handle and so as to be able to transmit high torques, it is advantageous for the handle neck 29 to be a non-enveloped zone. It is here that the fingertips are applied, which turn the handle during rapid screwing with a low torque. A flexible plastic ring terminates the handle neck 29 and prevents a slipping over of the fingers or the need for a high holding force.

Furthermore the sprue 25 for the flexible jacket 22 is placed on a point of the handle where it is on the one hand possible to place the sprue channel 25 in the mould parting plane, which makes the sprue technically very simple, on the other hand small sprue studs remaining on the handle are not prejudicial. Such a point is the face 31 of the handle head or a short, axial attachment on the face. The connection of the sprue region on the handle head to the enveloped area of the handle is brought about by connecting webs 28 or channels, which pass through the non-enveloped zone 24 of the handle neck 29.

Such a plastic handle produced by the injection moulding method is consequently characterized in that the second plastic 22 is an elastomer, which covers the handle surface, whilst leaving free the handle cap 26 at the handle end remote from the blade and most of the handle neck 29. The sprue for the elastomer jacket is positioned in the vicinity of the face 31. The connection between the sprue region and the rear handle area is formed by webs 28 or channels, which pass axially through the handle neck.

FIG. 5 is a side view of a handle according to the invention, said handle having an injection moulding core 30. Around the said injection moulding core is injection moulded a first material core 21. Said core 21 extends up to the radially directed, tool-side handle face 31. Apart from the surface area 24 of the first material, which partly forms the surface of the handle in the vicinity of the rapid turning zone 24, and apart from the spherical segmental end region at the tool-remote end of the handle, the top of the handle is formed by the second material surface area 23. This is in particular the case in the gripping area of the handle. The second material, which is preferably a thermoplastic elastomer, envelops the first material, preferably e.g. polypropylene, in all the areas in which the first material does not form the handle surface. According to a preferred development the envelope 22 with the second material is constructed as one-piece, continuous component.

The handle core 21 formed from the first material projects further in the tool direction than the actual handle end. Either its outer contour in this area and/or a relief 13 formed on the face 31 is used for providing information, e.g. the intended use of the tool fixed to the handle, as a brand name or the like.

FIG. 6 is a plan view of the face 31 of a handle according to the invention. An alternative to the embodiment of FIG. 1 is shown, in which the envelope 22 is extended up to the front, tool-side end of the handle and consequently up to the end of face 31. The core 21 does not project axially with respect to the face 31 in the remaining area. The contour 17 between the first material forming the core of the handle 31 and which is injection moulded round the injection moulding core 30 and the area of the second material forming the envelope 22 and which is injection moulded round the handle core 21 serves to provide information. In the represented embodiment the contour line 17 is in the form of a hexagon. The hexagon is intended to symbolize that the tool is a screwdriver, which can be used for external hexagon head screws. It is particularly advantageous if the two materials can be optically distinguished from one another and preferably have a different colour. The injection moulding core 30 is located in the centre of the face and can be a core used only in the injection moulding process and which is subsequently removed or can be a receptacle for replacement tools, which can be inserted in the handle. The injection moulding core 30 can also be a tool shank or blade, which is injection moulded in non-removable manner into the handle.

A method for the manufacture of a handle according to the invention is shown in FIG. 7. According to step 701 the injection moulding core is placed in a first mould serving as the female mould for the injection moulding of the first material. Following step 702 the injection moulding core is injection moulded round with a first material. According to step 703 the core is placed in a second injection mould, which is constructed as the female mould for the complete handle surface. In step 704, from an injection moulding point located outside the gripping area of the handle, injection moulding takes place of the second material, which is distinguishable from the first material. Injection moulding of the first material takes place in such a way that in the first material is formed at least one flow channel, so that the second material gives a one-piece, continuous moulded part.

What is claimed is:

1. A method for making a handle for a hand turning tool having a tool-side end and an opposite end, the method comprising:

providing an injection molding core;

forming a handle core of a first material in a shape having a flow channel and raised portions which form surface areas at least at the tool-side end of the handle, said flow channel having one end communicating with said tool-side end for receiving a second material and said flow channel having an opposite end communicating with gripping surface areas of the handle to be formed of the second material, said flow channel being exposed on an outer surface of the tool along a full length of said handle core, said handle core being formed by flowing the first material onto the injection molding core with a suitable mold in place to form the aforementioned shape of said handle core;

forming a handle gripping surface of a second material by flowing the second material onto the handle core at an injection molding point that is disposed only at a tool-side face of said tool-side end with a suitable mold in place to form said handle surface; and wherein a non-smooth portion of a surface provided by an injection molding point is disposed only at a tool-side face of said tool-side end.

2. Method for a hand tool according to claim 1, wherein the second material forms a one-piece body of material.

3. Method according to claim 1, wherein the first material and the second material are at least one of: a) different color and b) different radial projection, so as to be easily visually distinguished from one another.

4. Method according to claim 1, wherein the second material has a higher static friction coefficient than the first material.

5. Method according to claim 1, wherein the second material forms most of the handle surface and in particular completely forms the surface parts to which torque is manually applied during a turning process.

6. Method according to claim 1, wherein at the tool-side end of the handle, discontinuous areas of the first material form the handle surface.

7. Method according to claim 6, wherein the areas of the surface of the first material at the tool-side end are surrounded on all sides by continuous surface areas of the second material.

8. Method according to claim 1, wherein the surface at the opposite end which is remote from the tool-side end has a cap-like surface of the first material.

9. Method according to claim 1, wherein the handle surface is constructed as a carrier of information.

10. Method according to claim 9, wherein the information is formed with boundaries of the areas separating the first and second materials.

11. Method according to claim 10, wherein the boundaries between the first and second materials are formed such that the contours of the areas of the first material represent the intended use of the tool.

12. Method according to claim 1, wherein the handle is undetachably shaped onto a tool.

13. Method according to claim 12, wherein the tool is a screwdriver.

14. Method according to claim 1, wherein the surface includes visually distinct contour lines.

15. Method according to claim 14, wherein the contour lines are in the form of a relief on the surface.

16. Method according to claim 15, wherein the contour lines are formed as a boundary between the visually distinguishable materials.

17. Method according to claim 16, wherein the first material and the second material are applied in successive injection molding processes.

18. Method according to claim 17, wherein the handle core is formed from the first material, which is radially inwardly located and the surface of the handle is preponderantly formed from the second material.

19. Method according to claim 18, wherein the surface is formed preponderantly from the first material.

* * * * *

UNITED STATES PATENT AND TRADEMARK OFFICE
CERTIFICATE OF CORRECTION

PATENT NO.     : 6,749,790 B1
DATED          : June 15, 2004
INVENTOR(S)    : Karl Lieser and Andreas Dierolf It is certified that error appears in the above-identified patent and that said Letters Patent is hereby corrected as shown below:

Title page,
Item [73], Assignee, "Adolf Wurth GmbH & Co. KG, Kuenzelsav (DE)" should be
-- Assignee: Adolf Wuerth GmBH & Co., KG, Kuenzelsau (DE) --.

Signed and Sealed this

Twenty-sixth Day of April, 2005

JON W. DUDAS
*Director of the United States Patent and Trademark Office*